United States Patent [19]

Gilbert et al.

[11] Patent Number: 5,012,917

[45] Date of Patent: May 7, 1991

[54] TRANSPORT APPARATUS FOR AN ASSEMBLY LINE

[75] Inventors: Arthur Gilbert, Ludwigshafen; Norbert Gottstein, Weinheim; Joachim Rostock, Heidelberg, all of Fed. Rep. of Germany

[73] Assignee: Mannesmann Aktiengesellschaft, Düsseldorf, Fed. Rep. of Germany

[21] Appl. No.: 370,939

[22] Filed: Jun. 23, 1989

[30] Foreign Application Priority Data

Nov. 25, 1988 [DE] Fed. Rep. of Germany ....... 3840256

[51] Int. Cl.5 .............................................. B65G 21/20
[52] U.S. Cl. ............................. 198/465.2; 198/465.1; 198/795
[58] Field of Search ................. 198/465.1, 465.2, 795; 29/430, 824, 33 P; 364/468, 478

[56] References Cited

U.S. PATENT DOCUMENTS

| 2,971,634 | 2/1961 | Wilde et al. | 198/795 |
| 2,999,579 | 9/1961 | Kostrzewa | 198/795 |
| 4,300,366 | 11/1981 | Barrett | 198/795 X |
| 4,371,075 | 2/1983 | Erlichman | 198/465.2 X |
| 4,475,642 | 10/1984 | Fritz | 198/465.1 X |
| 4,548,135 | 10/1985 | Kupczyk | 198/465.1 X |
| 4,591,991 | 5/1986 | Sticht | 29/33 P X |
| 4,693,358 | 9/1987 | Kondo et al. | 29/430 X |
| 4,783,904 | 11/1988 | Kimura | 198/465.2 X |

FOREIGN PATENT DOCUMENTS

| 0466951 | 8/1950 | Canada | 198/795 |
| 0134255 | 3/1985 | European Pat. Off. . | |
| 2835565 | 2/1980 | Fed. Rep. of Germany . | |
| 3100159 | 8/1982 | Fed. Rep. of Germany . | |
| 0754911 | 8/1956 | United Kingdom | 198/465.2 |

Primary Examiner—Robert P. Olszewski
Assistant Examiner—James R. Bidwell
Attorney, Agent, or Firm—Nils H. Ljungman & Associates

[57] ABSTRACT

Transport apparatus for an assembly line for objects such as vehicle bodies. The transport apparatus include a plurality of movable platforms which are positioned in end to end contact with one another. A drive mechanism applies a force to one of the platforms which, in turn, is applied to the remainder of the platforms causing them to move along the assembly line.

18 Claims, 3 Drawing Sheets

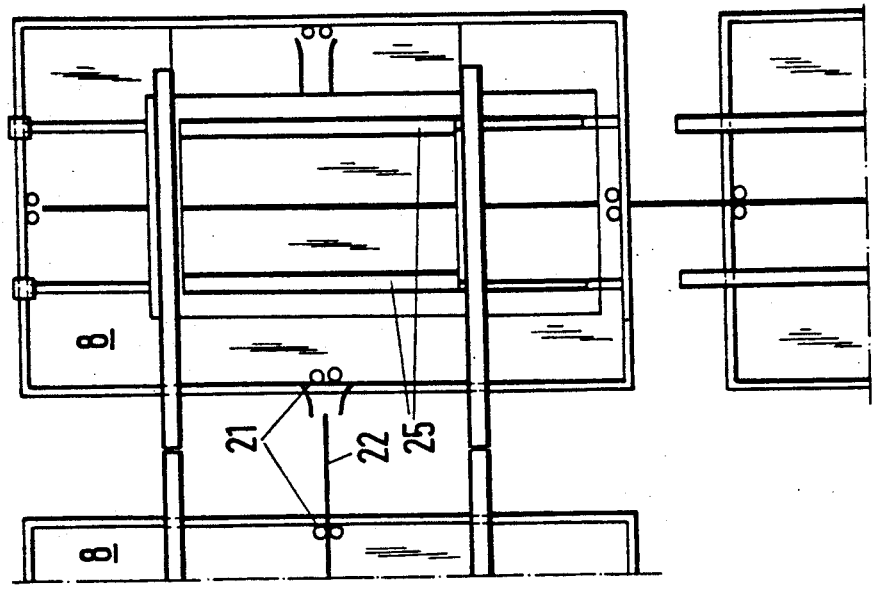
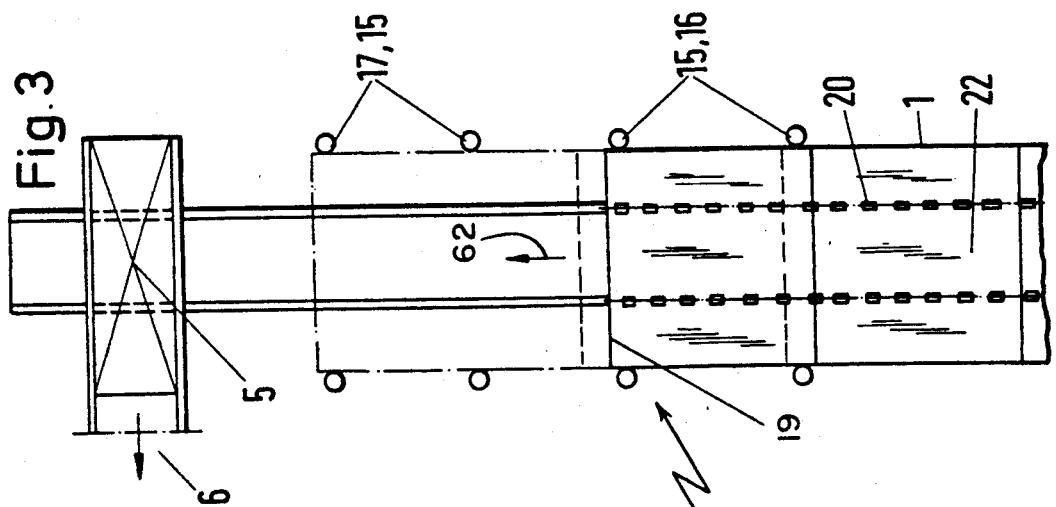
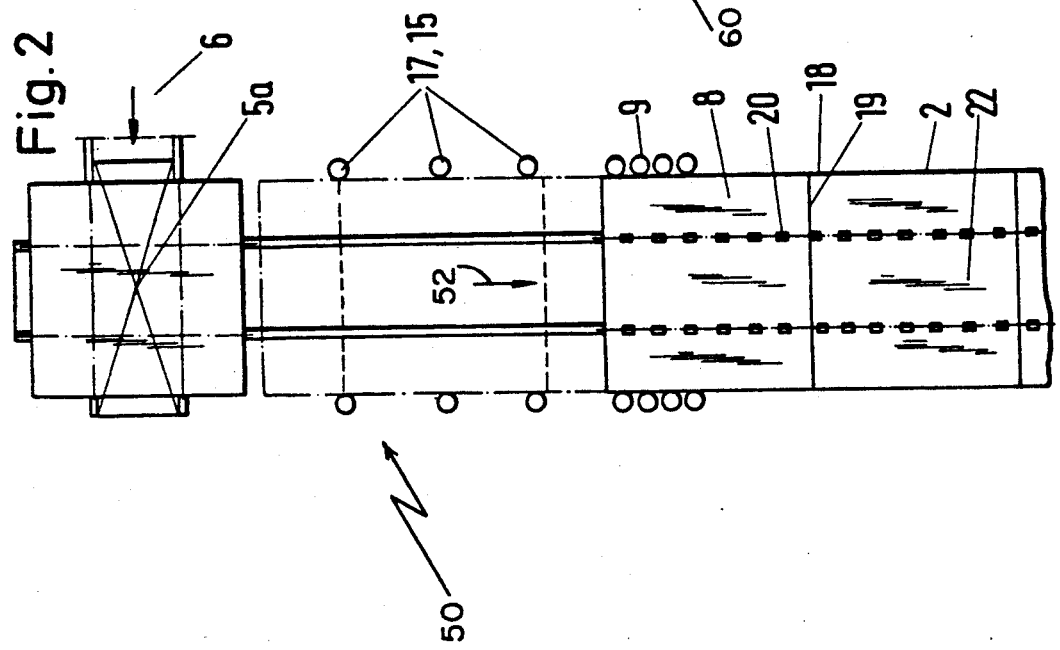

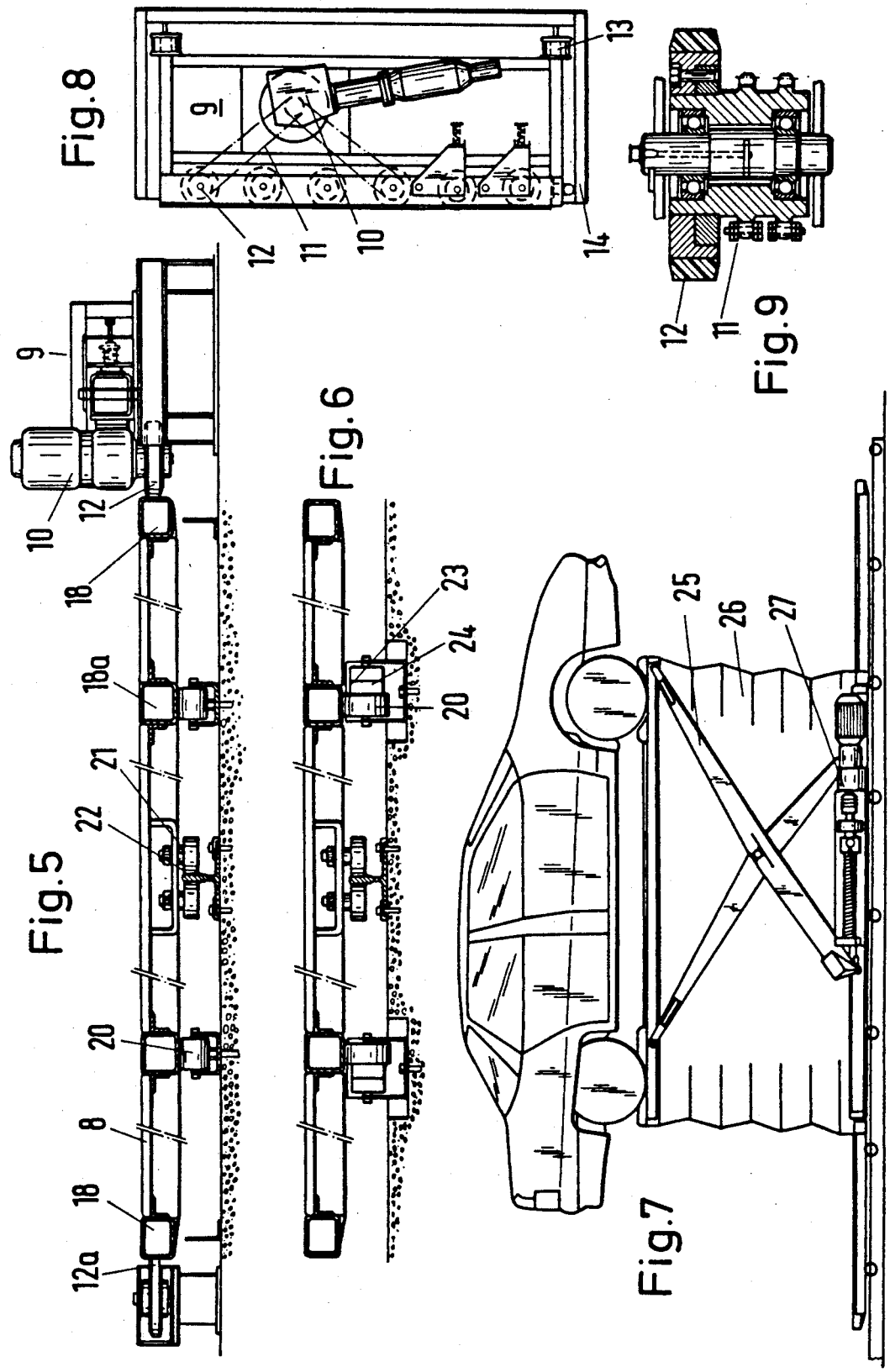

TRANSPORT APPARATUS FOR AN ASSEMBLY LINE

BACKGROUND OF THE INVENTION

1. Field of the Invention

This invention relates to a transport apparatus for an assembly line, which is particularly useful in conjunction with the assembly of vehicle bodies on movable platforms, or skids, although the invention is also useful in the assembly of items other than vehicle bodies.

2. Description of the Prior Art

Assembly lines are, frequently, installed in the floor and are guided on support rails also installed in the floor. The drive force is provided by a circulating drive chain, which extends over the entire length of the assembly line.

As a result of the installation of the assembly line itself in the floor, the fabrication facility becomes unnecessarily expensive and complex and can be modified only if the entire floor is replaced. Since the static integrity of a building cannot be guaranteed after such a process, it is impossible to avoid structural damages during such modifications.

OBJECT OF THE INVENTION

The object of the invention is, therefore, to provide a transport apparatus for an assembly line which is less expensive to construct and which allows for modification without the need to replace the entire floor to avoid structural damage.

SUMMARY OF THE INVENTION

This object is achieved in that the platforms can be moved on stationary support rollers, and can be driven by stationary drive wheels, which are located only at the beginning of each assembly line, and roll against the lateral supports of the platforms, whose front and rear transverse supports or edges are in contact with one another and push all the platforms of an assembly line.

The upper edges of the platforms are at a height of approximately 200 mm, which is the normal height of a step in a flight of stairs, and, if the edge of the platform is identified in some manner, the workers can subconsciously step over it. As a result of the slightly raised position of the working platforms, there are no disadvantages for the execution of the work, while the fabrication costs of the transport apparatus are significantly reduced, and subsequent modifications can be easily carried out.

In another configuration of the invention, the drive wheels are friction gears, and their motors are brake motors. When they are engaged, they exert a constant drive force.

Several friction gears are located immediately behind one another and are connected by means of a drive chain with one another and with the brake motor. At the end of each assembly line, there is a brakeable stopping motor in contact with the platform by means of friction gears. The stopping motor guarantees that all the platforms of an assembly line are always in contact with one another. To transport the platforms on an assembly line, either the drive forces of the brake motors are applied at the beginning of the assembly line by increasing the power, or the power of the stopping motors at the end of the assembly line is reduced, so that any desired transport velocity can be achieved.

The interval between the support rollers, depending on the platform, is approximately 600 mm. In addition to guide rollers in contact with guide rails and which rotate around vertical axes, they can also each have a scissor-type elevating platform for the articles being transported.

At the beginning and at the end of each assembly line, there are hoisting and lowering stations as well as transverse conveyors, which can comprise driven roller trains.

Further included is a transport apparatus for transporting movable platforms along an assembly line which has a first end and a second end such as for motor vehicles which includes first and second platforms each for supporting a vehicle with each said platform having a first end and a second end, with the second end being opposite the first end with the first end of the first platform for removably transmitting a force to the second end of the second platform. Further provided is support apparatus in contact with the platforms for supporting the platforms. Also provided is a drive apparatus positioned at a first end of the assembly line and in movable contact with the first platform for applying a force to the first platform with the force being transmitted from the first end of the first platform to the second end of the second platform to transport the first and second platforms along the assembly line, whereby the drive apparatus moves the first platform along the assembly line and the first platform pushes the second platform along the assembly line.

Additionally provided is a method for transporting movable platforms along an assembly line for motor vehicles which includes the steps of providing first and second platforms each for supporting a vehicle with each platform having a first end and second end which is opposite the first end with the first end of the first platform for removably transmitting a force to the second end of the second platform, providing support apparatus in contact with the platform apparatus for supporting the platform apparatus, providing and positioning drive apparatus at a first end of the assembly line which is in movable contact with the first platform for applying a force to the first platform. Also provided are the steps of transmitting the force from the first end of the first platform to the second end of the second platform, and transporting the first and second platforms along the assembly line, whereby the drive apparatus moves the first platform along the assembly line and the first platform pushes the second platform along the assembly line.

One aspect of the invention resides broadly in a transport apparatus for transporting movable platforms along an assembly line which has a first end and a second end such as for motor vehicles including: first and second platforms devices each for supporting a vehicle with each of the platform devices having a first end and a second end, the second end being opposite the first end with the first end of the first platform device removably contacting the second end of the second platform device; support apparatus which is in contact with the platform device for supporting the platform device; and drive device positioned at the first end of the assembly line and which is in contact with the first of the platform devices for applying a force to the first platform device with the force being transmitted from the first end of the first platform device to the second end of the second platform device to transport the first and second platform device along the assembly line, whereby the drive device moves the first platform device along the assembly line and the first platform device pushes the second platform device along the assembly line.

Another aspect of the invention resides broadly in a method for transporting movable platforms along an assembly line for motor vehicles including the steps of: providing first and second platform devices each for supporting a vehicle with each of the platform devices having a first end and a second end which is opposite the first end, with the first end of the first platform device removably contacting the second end of the second platform device; providing support apparatus in contact with the platform device for supporting the platform device; providing and positioning drive device at a first end of the assembly line which is in movable contact with the first platform device for applying a force to the first platform device; transmitting the force from the first end of the first platform device to the second end of the second platform device: and transporting the first and second platform device along the assembly line, whereby the drive device moves the first platform device along the assembly line and the first platform device pushes the second platform device along the assembly line.

BRIEF DESCRIPTION OF THE DRAWINGS

The present invention may be better understood when considered in view of the following Detailed Description of the Preferred Embodiments taken in conjunction with the appended drawings in which:

FIG. 2 shows a top view of a portion of the apparatus of FIG. 1;

FIG. 3 shows a top view of a portion of the apparatus of FIG. 1;

FIG. 4 shows a transition from transverse to longitudinal transport;

FIG. 5 shows a cross section through an assembly line on an enlarged scale:

FIG. 6 shows a cross section through a transverse conveyor of the system;

FIG. 7 shows a side view of a platform with an automobile:

FIG. 8 shows an overhead view of a drive unit: and

FIG. 9 shows a cross section through a friction gear with drive.

DETAILED DESCRIPTION OF THE PREFERRED EMBODIMENTS

Figure 1:
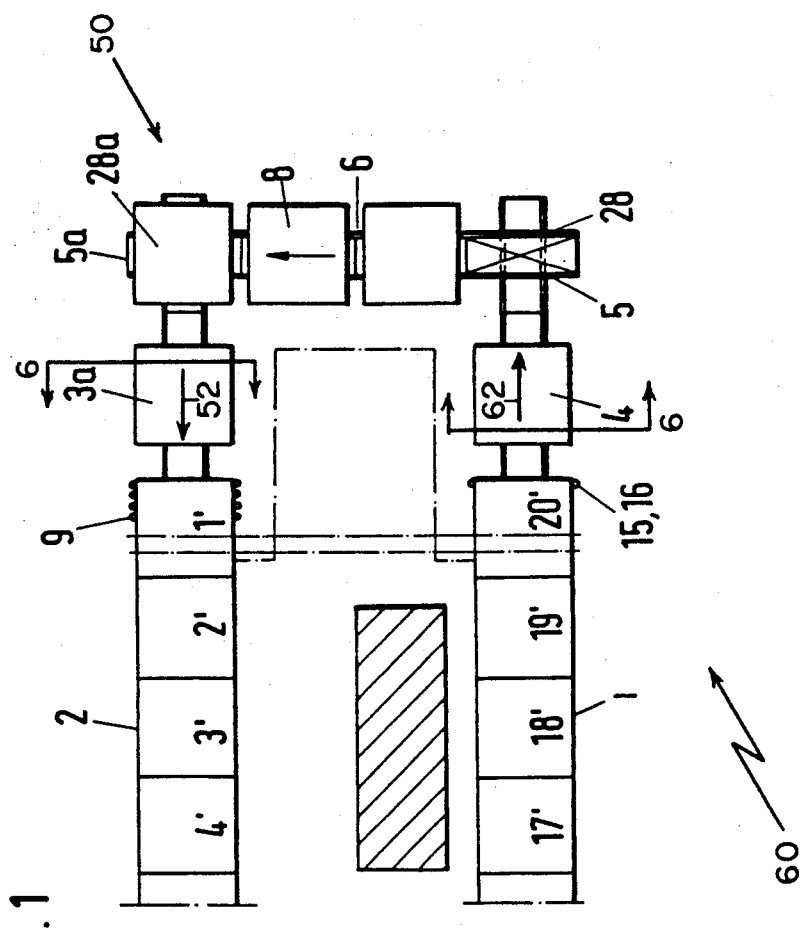
FIG. 1 shows a top view of a portion of the present invention.
Figure 1:
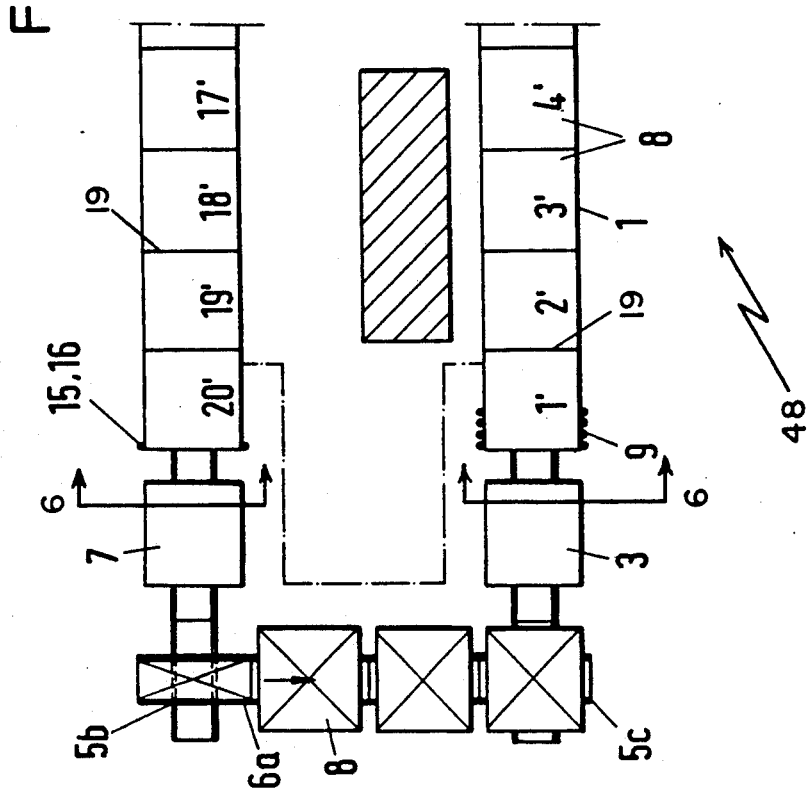

Transport apparatus 48, illustrated in FIG. 1 has two assembly lines 1 and 2 each with the work stations 1' to 20'. Line 1 is designed to operate in the direction of arrow 62 while line 2 is designed to operate in the direction of arrow 52. The items to be fabricated are entered into transport apparatus 48 at starting station 3, and are conducted by means of the assembly line 1 through intermediate station 4 which forms a part of corner transfer 5 which in turn forms a part of assembly line portion 60. Thereafter, the items are conducted from corner transfer 5 to transverse conveyor 6. For purposes of illustration only the present invention will be described with respect to the assembly of car bodies, although the principles of the invention are applicable to the assembly of other items as well. Transfer conductor 6 conducts the car bodies to corner transfer 5a, whereafter they are then conducted to starting station 3a at the beginning of assembly line 2. Transfer assembly 5a forms a part of assembly line portion 50. Terminal station 7 is at the end of line 2.

The finished vehicles, or car bodies, are removed from platforms 8 at terminal station 7 and platforms 8 are then returned, by means of the corner transfers 5b and 5c and transverse conveyor 6a, to starting station 3, where they are loaded with new bodies. Platforms 8 may be supported by lateral supports 18.

Adjacents starting stations 3 and 3a are drive units 9, which simultaneously push all platforms 8 along each assembly line since all of platforms 8, for each respective assembly line, are in contact with one another at edges 19.

Other examples of assembly line platforms may be found in U.S. Pat. No. 4,591,991 entitled "Coding Method and System for Assembly Line Pallets", the contents of which is hereby incorporated by reference.

For each assembly line, there is a brake motor 10 connected by means of drive chains 11 with all the friction gears 12 of a drive unit, as shown by FIGS. 8 and 9. Each drive unit 9 is installed on springs 13 in a common frame, so that the friction gears 12 are pressed against lateral supports 18 of the platforms 8.

At each end, opposite their respective starting end, assembly lines 1 and 2 have stopping motors 15 which include friction gears 16 that are in contact with platform 8, of the assembly line, which is farthest forward in the transport direction. Stopping motors 15 and friction gears 16 prevent the unintentional rolling of the platforms 8 in a series. The stopping force of these stopping motors 15 is just barely overcome by the propulsive force of the drive motors 10.

After platforms 8 encounter friction gears 16, of assembly line 1, they then travel over a roller train or a conveyor belt to the intermediate station 4, and then to the corner transfer 5. Here, the platforms 8 are lifted by hoisting station 28 of the transverse conveyor 6, and transported to the corner transfer 5a of the assembly line 2. There they are lowered onto a conveyor by lowering station 28a and transported via starting station 3a to the beginning of the assembly line 2, where they are again taken up by the drive units 9 and are propelled forward. After traversing assembly line 2, platforms 8 are braked by the stopping motors 15. Platforms 8 then reach terminal station 7, where the body is removed or a finished vehicle rolls off the assembly line on its own wheels. Platforms 8 are then transported via the transverse conveyor 6a to the assembly line 1, and a new body is loaded on in the starting station 3.

Instead of conveyor belts or roller trains, starting and intermediate stations 3, 4 and 3a and terminal station 7 may also employ controlled travelling mechanisms 17, which include friction gears 15 as shown in FIGS. 2 and 3.

Platforms 8 are moved forward with their flat underside on inside longitudinal supports 18a by means of stationary support rollers 20, and are guided by guide rollers 21 on the vertical web of a T-shaped guide rail 22, as shown in FIGS. 4 to 6. FIG. 5 also shows the drive unit 9 with the brake motor 10 and the friction wheel 12. The opposite friction wheel 12a is not driven in this case, and improves the guidance in the vicinity of the drive of the assembly line.

FIG. 6 shows a cross section through the vicinity of the starting stations 3 and 3a, intermediate station 4 and terminal station 7 with the drive belts 23 for gear wheels 24 of the support rollers 20.

FIG. 7 shows a scissor-type elevating platform 25 with a protective bellows 26, which prevents hazardous contact with the hoist mechanism 27. Other examples of scissor-type elevating platforms may be found in U.S. Pat. Nos. 4,171,120 and 4,114,854 both of which are entitled "Scissors Lift Work Platform." the contents of which are hereby incorporated by reference.

Other examples of assembly lines may be found in German Laid Open Patent Application No. 31 00 158 and U.S. Pat. No. 4,683,651, entitled "Vehicle Assembly Line", U.S. Pat. No. 4,693,358 entitled "Vehicle Body Conveyance in Assembly Line" and U.S. Pat. No. 4,793,055 entitled "Assembly Line Arrangement for Producing Vehicles", the contents of which are hereby incorporated by reference.

In summary, what is provided is transport apparatus for an assembly line, e.g. for the assembly of motor vehicle bodies, on movable platforms, characterized by the fact that the platforms 8 can be moved on stationary support rollers 20 and driven by stationary drive wheels 9, which are located at the beginning of the assembly lines 1, 2 and are in contact with at least one lateral support 18 of the platforms 8 in this vicinity, and that the transverse support 19 are in contact with the front of rear sides of the platforms on the assembly line. Further provided is transport apparatus which is characterized by the fact that the drive wheels are friction gears 12. Also provided is transport apparatus which is characterized by the fact that the motors for the friction gear drives are brake motor 10.

Additionally provided is transport apparatus which is characterized by the fact that several friction gears 12 are located immediately behind one another and are connected by means of a drive chain 11 to one another and to the brake motor 10. Further provided is transport apparatus which is characterized by the fact that at the end of each assembly line 1, 2 there are brakeable stopping motors 15 with friction gears 16 in contact with platforms 8. Also provided is transport apparatus which is characterized by the fact that the interval between the stationary support rollers 20 is approximately 600 millimeters.

Further provided is transport apparatus which is characterized by the fact that the platforms 8 are flexible. Additionally provided is transport apparatus which is characterized by the fact that platforms 8 can be rotated around vertical axes, and have guide rollers 21 which are in contact with a guide rail 22.

Further provided is transport apparatus which is characterized by the fact that at the beginning and the end of the assembly lines 1, 2, there are hoisting and lowering stations 28 as well as corner transfers 5 and driven transverse conveyors 6. Also provided is transport apparatus which is characterized by the fact that the transverse conveyors 6 and 6a are driven roller trains. Additionally provided is transport apparatus which is characterized by the fact that the platforms 8 have scissor-type elevating platforms 25 for the items (car bodies) being transported.

The invention as described hereinabove in the context of a preferred embodiment is not to be taken as limited to all of the provided details thereof, since modifications and variations thereof may be made without departing from the spirit and scope of the invention.

We claim:

1. Transport apparatus for transporting movable platforms along an assembly line which has a first end and a second end such as for motor vehicles, said transport apparatus comprising;
    first and second platform means each for supporting a vehicle with each said platform means having a first end and a second end, said second end being opposite said first end with said first end of said first platform means for removably transmitting a force to said second end of said second platform means;
    support means for being in contact with said platform means for supporting said platform means;
    drive means positioned at the first end of the assembly line and for being in contact with said first platform means for applying a force to said first platform means with said force being transmitted from said first end of said first platform means to said second end of said second platform means to transport said first and second platform means along the assembly line; and
    brake means at the second end of the assembly line and for being in contact with said platform means and for resisting movement of said platform means along the assembly line, whereby said drive means moves said first platform means along the assembly line and said first platform means pushes said second platform means along the assembly line.

2. The apparatus according to claim 1, wherein said drive means includes wheel means.

3. The apparatus according to claim 2, wherein:
    first and second platforms means each for supporting a vehicle with each said platform means having a first end and a second end, said second end being opposite said first end with said first end of said first platform means for removably transmitting a force to said second end of said second platform means;
    support means for being in contact with each said platform means for supporting said platform means, each said support means for being positioned at least partially laterally said platform means; and
    drive means positioned at least partially laterally said support means and positioned at the first end of the assembly line and for being in contact with said support means of a first of said platform means for applying a force to said first platform means with said force being transmitted from said first end of said first platform means to said second end of said second platform means to transport said first and second platform means along the assembly line;
    said drive means including wheel means; and
    said drive means are friction wheel means.

4. The apparatus according to claim 1, further including brake motor means in contact with said platform means for resisting movement of said platform means along the assembly line.

5. The apparatus according to claim 3, wherein said friction wheel means are biased drive wheel means.

6. The apparatus according to claim 5, wherein said biased drive wheel means are mechanically connected to rotate in unison.

7. The apparatus according to claim 6, wherein said brake means includes breakable stopping motor means with friction gears in contact with said platform means.

8. The apparatus according to claim 1, wherein said support means are stationary support means.

9. The apparatus according to claim 8, wherein adjacent said stationary support means are spaced apart by approximately 600 millimeters.

10. The apparatus according to claim 1, further including vertical elevation means for raising and lowering said platform means.

11. The apparatus according to claim 10, further including vertical hoisting and lowering stations for respectively providing to and receiving from said vertical elevations means said platform means.

12. The apparatus according to claim 11, further including corner transfer means adjacent to the assembly line for changing the direction of movement said platform means.

13. The apparatus according to claim 12, further including transverse conveyor means for transporting said platform means in a direction which is transverse to the direction of movement of said platform means along the assembly line.

14. The apparatus according to claim 13, wherein said transverse conveyor means is driven roller train means.

15. The apparatus according to claim 1 further including vertical elevation means for changing the elevation of said platform means.

16. The apparatus according to claim 15, wherein said vertical elevation means is scissor-type elevation means.

17. Transport apparatus for transporting movable platforms along an assembly line which has a first end and a second end such as for motor vehicles comprising:
   first and second platforms means each for supporting a vehicle with each said platform means having a first end and a second end, said second end being opposite said first end with said first end of said first platform means for removably transmitting a force to said second end of said second platform means;
   support means for being in contact with said platform means for supporting said platform means;
   drive means positioned at the first end of the assembly line and for being in contact with a first of said platform means for applying a force to said first platform means with said force being transmitted from said first end of said first platform means to said second end of said second platform means to transport said first and second platform means along the assembly line; and
   brake means at the second end of said assembly line and in contact with said platform means for resisting movement of said platform means along the assembly line;
   said drive means including wheel means;
   said wheel means being friction wheel means;
   said friction wheel means being biased drive wheel means; and
   said biased drive wheel means being mechanically connected to rotate in unison whereby said drive means moves said first platform means along the assembly line and said first platform means pushes said second platform means along the assembly line.

18. Transport apparatus for transporting movable platforms along an assembly line which has a first end and a second end such as for motor vehicles, said transport apparatus for being mechanically attached to a floor, said transport support apparatus comprising:
   first and second platforms means each for supporting a vehicle with each said platform means having a first end and a second end, said second end being opposite said first end with said first end of said first platform means for removably transmitting a force to said second end of said second platform means;
   support means for being in contact with each said platform means for supporting said platform means, each said support means being positioned at least partially laterally said platform means; and
   drive means positioned at the first end of the assembly line and for being in contact with said support means of a first of said platform means for applying a force to said first platform means with said force being transmitted from said first end of said first platform means to said second end of said second platform means to transport said first and second platform means along the assembly line;
   said drive means for being attached to said floor;
   said drive means including wheel means; and
   said wheel means being friction wheel means, whereby said drive means moves said first platform means along the assembly line and said first platform means pushes said second platform means along the assembly line.

* * * * *

UNITED STATES PATENT AND TRADEMARK OFFICE
CERTIFICATE OF CORRECTION

PATENT NO. : 5,012,917

DATED : May 7, 1991

INVENTOR(S) : Arthur GILBERT, Norbert GOTTSTEIN and Joachim ROSTOCK

It is certified that error appears in the above-identified patent and that said Letters Patent is hereby corrected as shown below:

COLUMN 6;

In Claim 3, delete lines 2-22 in their entirety. The lines begin with 'first and second...' and end with 'wheel means; and'.

In Claim 3, line 24, after 'said', delete "drive" and insert --wheel--.

In Claim 7, line 2, after 'includes', delete "breakable" and insert --brakeable--.

Signed and Sealed this

Twenty-fourth Day of November, 1992

Attest:

DOUGLAS B. COMER

*Attesting Officer*   *Acting Commissioner of Patents and Trademarks*